June 1, 1971     F. W. TALBOT     3,581,380
METHOD FOR MAKING TRANSMISSION BANDS
Filed Sept. 30, 1968     2 Sheets-Sheet 1
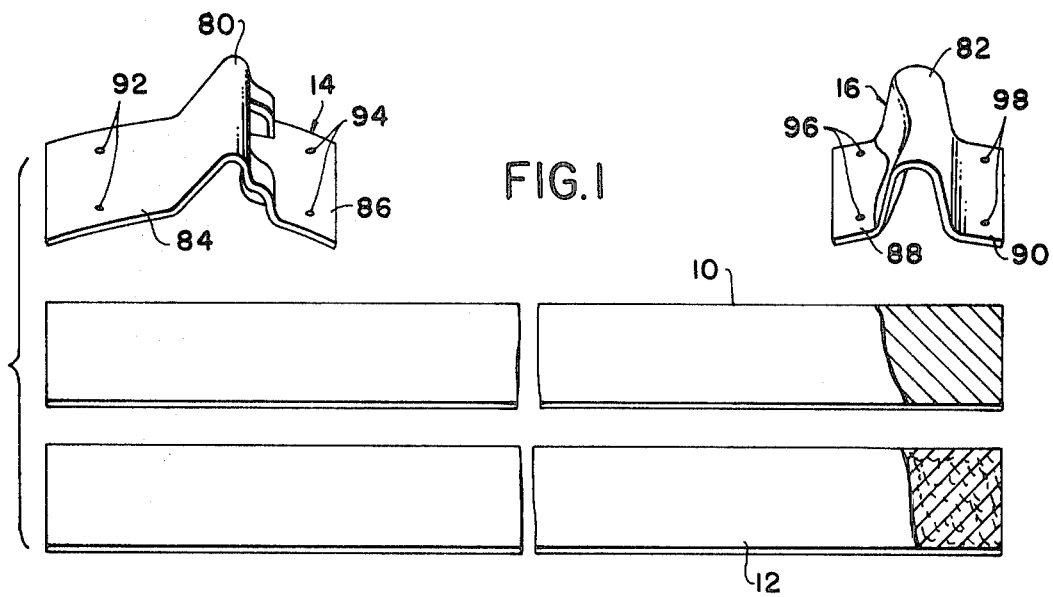
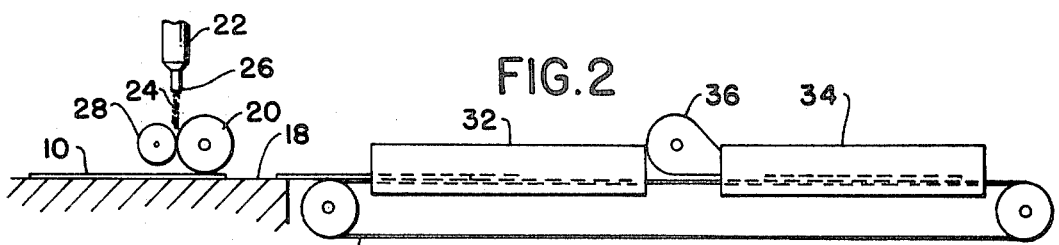
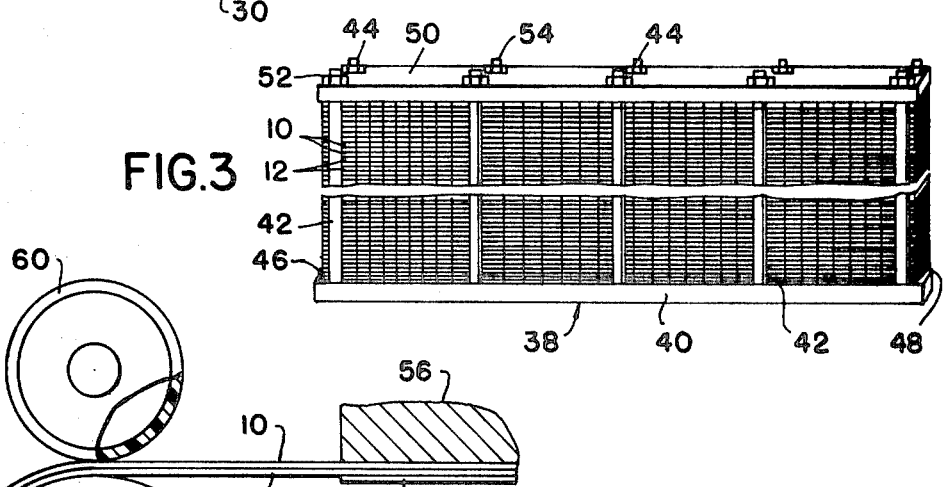
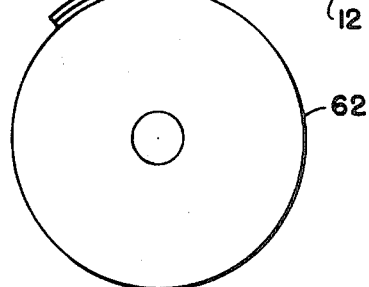
INVENTOR
FREDERIC W. TALBOT
BY Whittemore, Hulbert & Belknap
ATTORNEYS

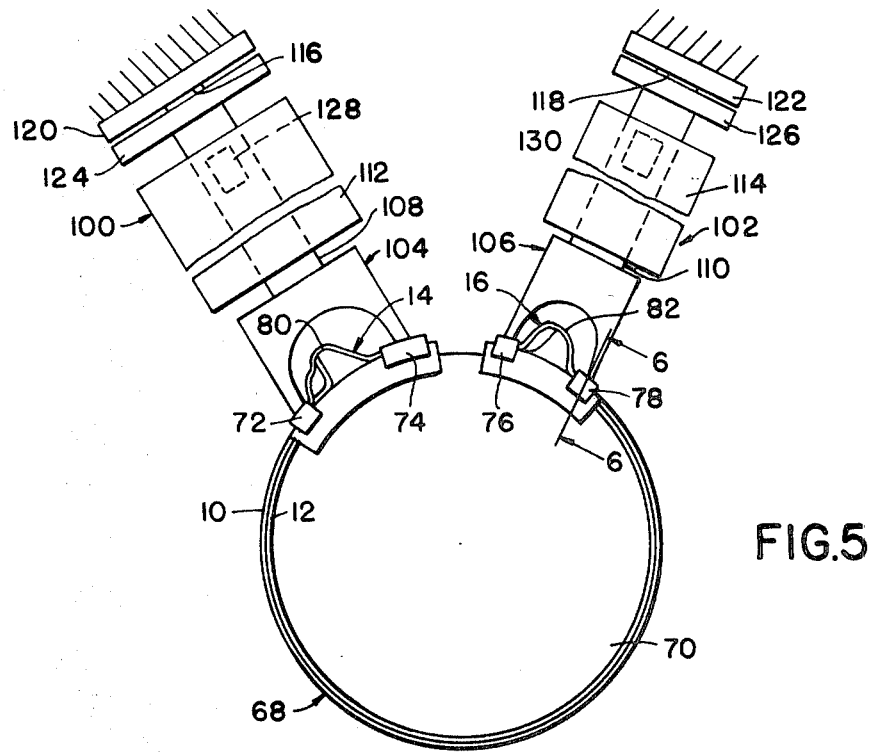

United States Patent Office 3,581,380
Patented June 1, 1971

3,581,380
METHOD FOR MAKING TRANSMISSION BANDS
Frederic W. Talbot, Waterford, Mich., assignor to Detroit Aluminum & Brass Corporation, Detroit, Mich.
Filed Sept. 30, 1968, Ser. No. 763,815
Int. Cl. *B23k 31/02*
U.S. Cl. 29—471.3
14 Claims

ABSTRACT OF THE DISCLOSURE

A method of manufacturing a transmission band for an automatic vehicle transmission is provided. The transmission band includes an arcuate metallic strip lined with a frictional strip. These strips are adhered together while in a flat, straight condition. The adhered strips are then formed into a generally arcuate shape with the lining strip on the interior. Brackets are then provided on each free end of the metallic strip. The brackets are preferably welded to the metallic strips. In the welding step, the brackets, which have projections thereon, are placed against the outer surface of the metallic strip with the projections in contact therewith. A welding electrode is then placed in pressure contact with the brackets and an electrical current is applied through the electrode, projections and metallic strip while the pressure is maintained to weld the projections to the metallic strip.

BACKGROUND OF THE INVENTION

The manufacture of transmission bands for automatic vehicle transmissions has been relatively expensive. The transmission bands, which have an arcuate shape, comprise an outer metallic strip and an inner frictional lining strip. A bracket is applied on each free end of the metallic strip for gripping of the band and tightening around a drum. The brackets have been welded to the metallic strip.

In the past, because of the high heat of welding, the metallic strips have first been formed into the arcuate shape desired and the brackets then welded onto the ends. The lining strip has then been adhered to the interior surface of the metallic strip. As will be appreciated, the process of adhering a lining strip to an arcuate metal band is time consuming and expensive. However, in order to avoid damage to the lining strip by the heat of welding, it has been necessary to adhere the lining strip at the last stage of the manufacture of the transmission band.

In accordance with the present invention, the lining strip is adhered to the metallic strip before the brackets are welded on. The adhering step thus may be accomplished while the strips are flat straight elements and may be done in a relatively automatic manner by passing the strips through rollers to apply a coat of adhesive and then stacking the strips and applying pressure and heat-curing the lining strip to the metallic strip. The adhered strips are then formed into the desired arcuate shape and the brackets welded on. The method of welding the brackets onto the strip is accomplished with a minimum of heat being applied to the band so that no damage is done to the lining strip. Alternately, the brackets may be formed by bending the ends of the metallic strip into the desired shape. This method does not involve welding and thus no heat damage can be done to the lining strip. The entire process is capable of automation and may be accomplished at a much lower cost than has previously been the case.

SUMMARY OF THE INVENTION

The method of manufacturing a transmission band for an automatic vehicle transmission comprises the steps of first adhering a frictional lining strip to one surface of a metallic strip. The adhered strips are then formed into a generally arcuate shape with the lining strip on the interior thereof. A bracket is then provided on each free end of the metallic strip on the exterior thereof. The brackets may be formed by bending the ends of the metallic strip or they may be welded onto the metallic strip. If the brackets are welded, they are provided with projections thereon and placed against the outer surface of the metallic strip with the projections in contact with the metallic strip. A welding electrode is then placed in pressure contact with the brackets and an electrical current is applied through the electrode, projections and metallic strip while maintaining the pressure contact to thereby weld the projections to the metalic strip and secure the brackets in place.

In the drawings:
FIG. 1 is an exploded view of the elements forming a transmission band which is fabricated in accordance with one embodiment of the method of the present invention;
FIG. 2 is a side elevational view illustrating the step of adhering the transmission band liner to the transmission band;
FIG. 3 is a view in perspective of apparatus for compressing a stack of bands with liners adhered thereto prior to heat curing of the assembly;
FIG. 4 is a top plan view of the step of rolling the band and liner into a circular shape;
FIG. 5 is a top plan view illustrating the step of welding brackets to the transmission band;
FIG. 6 is a sectional view taken substantially along the line 6—6 of FIG. 5 looking in the direction of the arrows;
FIG. 7 is a sectional view of a portion of the transmission band illustrating the brackets welded to the band;
FIG. 8 is a view of a portion of a transmission band illustrating a method of forming bracket portions from the material of the band.

FIG. 1 illustrates the elements from which the transmission band is constructed. The band comprises a metallic strip 10 to which is adhered a fractional strip of lining material 12. The strip 10 may be fabricated of any metal having the necessary strength characteristics to form a rigid backing for a transmission band. Conventionally, such strips are fabricated of cold-rolled steel. The strip 10 may have a thickness in the order of .065 inch. The lining strip 12 may be fabricated of a variety of different materials. It may be constructed from what is termed "paper" lining of the type formed on a paper making machine and comprising, for example, an asbestos base with cellulose intermixed therein and impregnated with graphite, iron oxide powder, or a resin. Alternately, the lining strip 12 may be of what is termed a "semi-metallic" material which is generally extruded and consists of a base of asbestos and having therein a relatively high content of metallic powders such as copper oxide, iron oxide, carbon, copper chips or woven wire. Additionally, what is termed "full-metallic" material may be used. A full-metallic material may be, for example, a metal powder sintered to a steel base. The lining strip 12 has a thickness of the order of .040 inch.

A metallic bracket 14, 16 is provided for each free end of the transmission band. The brackets are welded to the metallic strip 10. The function of the brackets is to provide a structure for attachment of power means to open and close the transmission band on a drum.

FIG. 2 illustrates the first step in the present method. A metallic strip 10 is placed on a support surface 18 and directed beneath a roller 20. The roller 20 is power driven and pulls the strip 10 therebeneath while at the same time depositing a layer of adhesive material on the upper surface thereof. Adhesive is constantly loaded on the surface of the roller 20 via a dispenser 22 provided thereabove. It will be noted that a stream 24 of adhesive is constantly ejected from the nozzle 26 of the dispenser onto the roller 20. A second smaller roller 28 is placed in rolling contact with the roller 20. The stream 24 is aimed at a point between the two rollers. The smaller roller 28 functions to even out the layer of adhesive on the roller 20 so that an even layer of adhesive will be applied to the strip 10.

As the roller 20 applies a film of adhesive to the strip 10, it also draws the strip 10 forwardly and onto an endless conveyor 30. The conveyor 30 carries the strip 10 through an oven 32 which is operated at an elevated temperature to partially cure the adhesive material.

Any number of commercially available adhesives may be used in accordance with the invention. Preferably, the adhesive is a thermosetting phenolic material. However, other materials, such as the epoxies, may be used.

After the strip 10 has passed through the oven 32 it is carried into a drying chamber 34 where it is air-dried. A blower 36 provides a constant air stream therethrough. When the strip 10 exits from the chamber 34, the adhesive is partially cured to a non-tacky state.

Then, as shown in FIG. 3, a plurality of strips 10 with a coating of partially cured adhesive on one surface thereof are stacked in a fixture 38 along with alternate lining strips 12 to form a stack. There may be, for example, forty metallic strips 10 and forty lining strips 12 in the stack. It will be appreciated that the surface of the metallic strip 10 having the layer of adhesive thereon faces a lining strip 12 so that these two members may be adhered together.

The fixture 38 comprises a metallic base 40 having five upstanding posts 42 on one side and spaced along the length thereof and five upstanding posts 44 on the other side and spaced along the length thereof. The line of posts 42 and the line of posts 44 are spaced a distance apart equal to the width of the strips 10, 12. A stop 46, 48 is provided on each end of the base 40 to position the strips lengthwise of the base.

After the stack has been formed, a top plate 50, having openings therein for reception on the posts 42, 44, is placed on the stack. The upper ends of the posts 42, 44 are threaded to receive nuts 52, 54. The nuts 52, 54 are loosely threaded onto the posts and then the plate 50 is subjected to a high pressure, for example, about 4,000 pounds, to compress the stack of strips 10, 12 and place them in intimate pressure contact with each other. After the desired amount of pressure has been applied, the nuts 52, 54 are tightly threaded into contact with the plate 50 to maintain the pressure. Application of this pressure not only guarantees intimate contact of the strips 10, 12 but aids in the cure of the adhesive.

The fixture 38 is then placed in an oven and heated at an elevated temperature of, for example, on the order of 375° to 450° F. for a period of time sufficient to cure the adhesive.

The fixture 38 is then removed from the oven and allowed to cool. After the assembly has cooled sufficiently, the metallic strips 10, which now have the lining strips 12 adhered thereto, are removed and formed into the conventional circular shape as shown in FIG. 4. The structure for rolling the assembly into a circular form comprises a guide member 56 having a groove 58 therein for reception of the assembly. The assembly is directed from the guide member 56 between a pair of rollers 60, 62. The roller 60 is of a smaller diameter than the roller 62. Preferably, the roller 60 is formed of a material such as polyurethane to provide a good gripping surface. The larger roller 62 is formed of a hard, metallic material such as steel. As is conventional, the assembly will follow the roller 62 as illustrated to form into a circular shaped band 68 as shown in FIGS. 5 and 7. There is a gap between the ends 64, 66 thus permitting the transmission band 68 to be flexed to a smaller diameter to grip a transmission drum.

FIGS. 5 and 6 illustrate the next step of the invention wherein the brackets 14, 16 are welded onto the metallic strip 10. As shown in FIG. 5, the circular band 68 is received on a cylindrical mandrel 70. The brackets 14, 16 are positioned on the mandrel 70 in correct relationship to the band by means of positioning and holding brackets 72, 74, 76, 78. It will be noted in FIG. 1 that each of the transmission band brackets comprises a loop portion 80, 82 from which extends feet 84, 86, 88, 90. A pair of indentations 92, 94, 96, 98, forming exterior projections on the lower surface of the feet, are provided in each of the feet. As will be noted, the feet are curved to match the configuration of the circular band 68.

The brackets 14, 16 are welded to the metallic strips 10 by means of what is termed "projection welding." As will be noted in FIG. 5, a welding structure 100, 102 is provided for each of the brackets 14, 16 adjacent to the mandrel 70. Each of the welding structures 100, 102 comprises a welding electrode 104, 106 which is carried on a shaft 108, 110. The shafts 108, 110 are slidingly received in housing 112, 114. The shafts 108, 110 are slidingly received on guide members 116, 118 secured to support structures 120, 122. Each of the members 116, 118 carries, at the outer end thereof, a permanent magnet 124, 126. A magnetic coil 128, 130 is provided within each housing 112, 114 to attract the magnets 124, 126 during the welding operation to provide what is termed "follow-up" pressure for the welding operation.

Each of the electrodes is provided with feet which have projections for reception in the indentations 92, 94, 96, 98 provided in the feet of the brackets. As will be seen in FIG. 6, the electrode 106 has feet 134, 136 with projections 138, 140 which are received in the indentation 98 of the foot 90 of bracket 16. As also will be noted in FIG. 6, a copper strip 142, 144 is provided on either side of the metallic strip 10 and in contact therewith when the strip is mounted on the mandrel 70. The copper strips 142, 144 are supported by electrical insulation 146, 148.

In operation of the welding equipment illustrated in FIG. 5, the electrodes 104, 106 are first advanced into pressure contact with the brackets 14, 16 by means of an air cylinder (not shown) provided within the housing structures 112, 114. After the electrodes have made sufficient physical contact with the brackets, a high amperage alternating current, in the order of 30,000 amperes, is applied for a very short time, for example, from three to eight cycles. This amperage is sufficient to cause welding of the indented material 92, 94, 96, 98 to the metallic strip 10. As will be noted in FIG. 6, the electrical path in the welding operation is quite short. The electrical path is from the projections 138, 140 through the thickness of the metal strip 10 and thence through the copper strips 142, 144. As will be appreciated, the complete electrical circuit for the welding equipment includes a source of power and a transformer (not shown) as is conventional.

During the short period when the electrical current is being applied, the indented material of the brackets is forced into the material of the strip 10 as a result of pressure applied to the bracket via the electrodes. It is critical that there be a rapid increase in pressure during the application of welding current so that the projections will be driven into the strip 10 while the material of the strip is in a plastic state and before the projections melt. It has been found that the use of a magnetic force to drive the electrodes is preferable in comparison with, for example, pneumatic or hydraulic systems wherein it is difficult if not impossible to achieve the split-second timing for the "follow-up" pressure necessary for this welding operation.

As shown in FIG. 7, after the brackets 14, 16 have been welded to the metal strip 10, the material of the projections of the brackets retains the basic shape as projections. This provides, in addition to the weld, a mechanical connection which results in a very strong welded construction. It has been found that if sufficient force is applied to the brackets 14, 16 to tear them away from the metal strip 10, the material of the strip 10 around the bracket projections will be torn loose rather than the weld breaking.

The rapidity with which the welding operation is accomplished results in only very localized heating of the brackets and material of the metal strip 10. The heating is not sufficient to cause any damage to the lining strip 12 or to affect the adhesive bond of the lining strip 12 to the metal strip 10. Almost immediately after the brackets 14, 16 have been welded to the strip 10, the unit may be picked up in the area of the brackets and the brackets will be only warm to the touch.

FIG. 8 illustrates an alternate method for fabricating a transmission band 150. The transmission band 150 is initially formed in the same manner as previously described in connection with the steps defined in FIGS. 2, 3 and 4. The lining strip 152 is adhered to the metal strip 154 in the manner previously described and the unit is rolled to the desired circular shape. However, instead of using separate brackets as was previously described, the ends 156, 158 of the metal strip 154 are bent into the desired bracket shape as illustrated. It is only necessary to provide an oversize or overlength metal strip 154 in order to provide the material for forming the bracket portions 156, 158. The bracket portions may be formed into the shape illustrated by conventional bending apparatus.

What I claim as my invention is:

1. A method of manufacturing a transmission band for an automatic vehicle transmission comprising the steps of adhering a generally flat frictional lining strip to one surface of a generally flat metallic strip, then forming the adhered strips into a generally arcuate shape with the lining strip on the interior thereof, and then providing a bracket on the exterior of each free end of the metallic strip.

2. The method as defined in claim 1, and further characterized in that said brackets have projections thereon and are provided on the free end of the metallic strip by placing said brackets against the outer surface of the metallic strip with the projections in contact with said surface, and then applying an electrical current through said projections and metallic strip to weld the projections to the metallic strip.

3. The method as defined in claim 2, and further characterized in that said brackets are welded to the metallic strip by placing a welding electrode in pressure contact with the brackets, and applying an electrical current through the electrode, projections and metallic strip while maintaining said pressure contact.

4. The method as defined in claim 2, and further characterized in that said electrical current is an alternating current applied for a short duration in the order of three to eight cycles.

5. The method as defined in claim 3, and further characterized in that the pressure applied by the electrode is increased while the electrical current is being applied.

6. The method as defined in claim 5, and further characterized in that said pressure is increased by the step of magnetically drawing the electrode against the brackets by means of magnetic attraction.

7. The method as defined in claim 1, and further characterized in that adhesive material is applied to a surface of one of frictional lining strip and metallic strip by loading a roller with adhesive in an uncured state, passing the strip against the roller in contact therewith to apply a layer of adhesive thereon, and then partially curing the adhesive to a non-tacky state.

8. The method as defined in claim 7, and further characterized in that, after partially curing the adhesive, a plurality of metallic strips and lining strips are stacked against one another in alternating fashion with the partially cured adhesive in contact with the surface of an adjacent strip, and then applying pressure and subjecting the stack of strips to an elevated temperature to fully cure the adhesive and adhere adjacent lining strips to adjacent metallic strips.

9. The method as defined in claim 1, and further characterized in that the adhered strips are formed into a generally arcuate shape by drawing the adhere strips between a pair of rollers one of which has the final desired shape and directing the adhered strips around said roller having the final desired shape.

10. The method as defined in claim 1, and further characterized in that the brackets are provided on each free end of the metallic strip by bending the ends of the metallic strip into the desired bracket shape.

11. A method of manufacturing a transmission band for an automatic vehicle transmission comprising the steps of adhering a generally flat frictional lining strip to one surface of a generally flat metallic strip, then forming the adhered strips into a generally arcuate shape with the lining strip on the interior thereof, then providing at least one bracket having projections thereon, placing said bracket against the outer surface of the metallic strip with the projections in contact with said surface, placing a welding electrode in pressure contact with the bracket, and applying an electrical current through the electrode, projections and metallic strip while maintaining said pressure contact to weld the projections to the metallic strip.

12. The method as defined in claim 11, and further characterized in that the pressure applied by the electrode is increased during the welding step to drive the projections into the metallic strip and maintain the integrity of the projections after the welding is completed.

13. The method as defined in claim 12, and further characterized in that said increase in pressure is obtained by magnetically drawing the electrode against the bracket.

14. The method as defined in claim 11, and further characterized in that said electrical current is an alternating current and is applied for a short duration of the order of from three to eight cycles.

References Cited
UNITED STATES PATENTS

| 1,706,635 | 3/1929 | Smith | 29—470.5X |
| 1,926,064 | 9/1933 | Sawtelle | 29—475 |
| 2,454,282 | 11/1948 | Johnson. | |
| 2,598,338 | 5/1952 | Arbogast | 29—470.7 |
| 3,367,466 | 2/1968 | Lang | 29—471.1X |
| 3,382,130 | 5/1968 | Della Vite | 156—547X |
| 3,388,234 | 6/1968 | Gentle, Jr. | 219—158X |
| 3,396,064 | 8/1968 | Hoffman | 156—563X |

JOHN F. CAMPBELL, Primary Examiner

R. B. LAZARUS, Assistant Examiner

U.S. Cl. X.R.

29—471.1, 480